3,512,183
BIOELECTRIC POLYURETHANE AND USE OF SAME IN INTERNAL PROSTHESES
William V. Sharp, Cuyahoga Falls, David L. Gardner, Akron, and Gilbert J. Andresen, Stow, Ohio, assignors to the United States of America as represented by the Assistant Secretary, Health and Scientific Affairs, Department of Health, Education, and Welfare
No Drawing. Filed June 8, 1967, Ser. No. 644,481
Int. Cl. A61f 1/24
U.S. Cl. 3—1                                  5 Claims

ABSTRACT OF THE DISCLOSURE

A composition comprising a bioelectric polyurethane having a negative static potential of from about 200 to 300 millivolts, and internal prostheses made thereof. Specifically a polyurethane composition containing 10 percent by weight of a conductive carbon black uniformly distributed therein. Artificial blood vessels made of a bioelectric polyurethane approximate natural blood vessels in physical and electrical characteristics.

---

This invention relates to bioelectric polyurethane as hereinafter defined and internal prostheses made of the same. More particularly this invention relates to a bioelectric polyurethane containing about 10 percent of a conductive carbon black and artificial blood vessels formed of the same.

Significant advances have been made in recent years in the development of various artificial organs to replace diseased or damaged organs in the body. At the same time, there has been much research without significant practical success in the field of vascular prosthetics. The main problem with which those working in this art have been plagued has been concerned with the complicated processes occurring at the blood-graft interface. It has been found that the addition of a solid foreign material, no matter what its composition might be, to the blood stream results in the formation of a blood clot on that material. Porous prosthetics have demonstrated considerable use in larger blood vessels, but have not proven successful when adapted to smaller arteries. Non-porous materials have lent themselves to experimentation in this field but success has not been achieved in their use in arteries of less than 4.0 mm. internal diameter. The solid materials have found considerable use in the field of artificial internal organs. They have been used in pumping chambers, arteries, and as materials for encompassing structures having moving parts. In all these embodiments a necessary property of the non-porous material is elasticity. This property is also required of the ideal vascular prosthetic material. It would be helpful, however, if the same material could be made into a rigid member.

Various techniques have been suggested for improving the nonthrombogenic properties of plastic materials, but each prior art procedure suggested has suffered from one or more disadvantages. Generally, the use of these materials is limited either due to their chemical and physical properties or their short-term efficacy.

Various theories have been formulated to explain the causes of, and phenomena involving, the processes occurring at the blood-graft interface. Perhaps the most fascinating and physiologically sound concept of the nature of the vascular interface has been advanced by Sawyer et al.[1] Through numerous studies, that have been varied by others, they have shown that the inside of a functioning blood vessel possesses a negative electrical charge and that a potential difference exists between the inner and outer aspect of that vessel amounting to 0 to 5 microvolts. They have also proposed, based on experimentation that an appropriate potential difference at the blood intimal interface will prevent mural thrombosis. The results of Abramson's electrophoretic studies on blood samples have given added impetus to the bioelectric theory for homeostasis of blood.[2]

With one notable exception there has been absolutely no success is using impervious tubes of Dacron, Teflon, rubber latex, Viton-B, nylon, stainless steel, glass, and silicone rubber. The single exception is described by Sparks[3] who used silicone rubber and a non-suturing method of anastomosis. He reported 90 percent success in arteries of 4, 5, 6 and 9 mm. diameter. We have tried all of the above-mentioned materials with the average patency being limited to two hours or less.

Early studies demonstrated conclusively that a negative charge would prevent blood clotting. It became evident, however, that the application of a continuous direct current to healthy tissue would result in total destruction of the living cells. This was shown by both visual and electron microscopy. Surprisingly, we have found that by the use of a material possessing a built-in negative charge approximating that of a functioning blood vessel which is referred to herein as a "bioelectric" material for an artificial blood vessel we could substantially eliminate blood clotting on that material for periods as long as twelve days. More specifically, we have found that a polyurethane with about 10 percent of a conductive carbon black incorporated therein possesses ideal elastic properties for ordinary artificial blood vessel applications, can be altered to a near rigid state when necessary by varying the composition and curing operations, has the necessary bioelectric characteristics and low reactivity.

It is, therefore, an object of this invention to provide a prosthesis for internal use free of the aforementioned and other such disadvantages. It is a further object of this invention to provide a vascular prosthesis possessing the necessary elastic properties; low reactivity, and bioelectric characteristics approximating those of a functioning blood vessel; and which can be altered to a near rigid state. Moreover, it is another, important, object of this invention to provide a composition possessing the advantages enumerated in the foregoing objects of this invention from which an internal prosthesis, particularly a vascular prosthesis may be made. Specifically, it is an object of this invention to provide a bioelectric polyurethane suitable for use in vascular prostheses and vascular prostheses manufactured from said bioelectric polyurethane.

Other objects and advantages of this invention will be apparent from the following description and examples of preferred embodiments thereof.

The bioelectric polyurethane composition of this invention comprises any of the polyurethanes known in the art to which has been added about 10 percent of a conductive carbon black so that the composition exhibits a negative static potential of 200 to 300 millivolts. A conductive carbon black which is exemplary, but by no means limiting, is Shawinigan acetylene black. This black has an average particle size of 45 m$\mu$ and a surface area of 64 m.$^2$/g.

---

[1] Sawyer et al., "Some Electrochemical Properties of Solid-Liquid Interfaces, and the Electrode Behavior of Erythrocytes," Biophysical Mechanisms in Vascular Homeostasis and Intravascular Thrombosis, Sawyer, P.N., ed. (1965).

[2] Abramson, H. A., "Electrophoresis of Blood Cells," Biophysical Mechanisms in Vascular Homeostasis and Intravascular Thrombosis," Sawyer, P. N., ed. (1965).
[3] Sparks, C. H., Surg. Forum, 16 (1965), p. 130.

Polyurethanes suitable for use in this invention may be prepared by any method known in the art.

Type I. Prepolymer method

In the prepolymer method for the preparation of polyurethanes, hydroxyl terminated polyesters, polyethers, polycarbonates, polydienes with hydroxyl number 35 to 135 and molecular weight 840 to 3200 are reacted with an excess of organic diisocyanate or polyisocyanate to form a prepolymer having terminal isocyanate groups. The molar ratio of polyisocyanate to polyhydroxyl compound is from 1.2 to 3.0 moles of polyisocyanate to 1.0 mole of hydroxyl terminated compound. The preferred molar ratio of polyisocyanate to hydroxyl terminated polyol for the preparation of the prepolymer is approximately 2.0 moles of polyisocyanate to each mole of hydroxyl terminated polyol.

The polyesters are condensation products of dibasic acids such as adipic acid with glycols such as ethylene glycol, propylene glycol and tetramethylene glycol. The glycol is added in excess to insure the terminal hydroxyl end groups.

The polyethers suitable for the invention are the polytetramethylene glycol ethers prepared from the polymerization of tetrahydrofuran and polypropylene glycol ethers prepared from the polymerization of propylene oxide.

The hydroxy terminated polycarbonates are prepared by reacting the bis chloroformate of diethylene glycol with diethylene glycol.

The hydroxyl terminated polybutadienes may be obtained by peroxide polymerization of butadiene.

The organic polyisocyanates useful in this invention may be aromatic, aliphatic and cycloaliphatic.

The prepolymers may be characterized by the isocyanate content. They are dissolved in solvents, and blends of solvents, such as toluene, xylene, methyl ethyl ketone, acetone, methyl isobutyl ketone, Cellosolve acetate to give solids contents ranging from 10 to 60 percent. The diluted prepolymer may be analyzed for the available isocyanate end groups.

Examples of polyisocyanates useful in this invention are:

2,4-tolylene diisocyanate
4,4'-dicyclohexylmethane diisocyanate.
3,3'-dimethoxy-4,4'-diphenyl diisocyanate
xylene diisocyanate
1,5-naphthalene diisocyanate
hexamethylene diisocyanate
4,4'-dicyclohexylmethane diisocyanate.

Prepolymers based on 4,4' dicyclohexylmethane diisocyanate are preperred.

The conductive carbon black is then added to the prepolymer dissolved in suitable solvents. From one part to 40 parts of acetylene black per 100 parts of 100 percent prepolymer may be employed. The dispersion is accomplished by addition of metal or porcelain balls, metal rods or high speed agitation. When balls and rods are used the dispersion must be placed on rollers and rotated from 2 to 24 hours. The use of metal rods is preferred.

The conductive prepolymer is then treated with an extending agent which may be water, low molecular weight glycols, triols and polyols, or polyamines. The extending agent is added in a deficiency to the total available isocyanate.

The polyamines are preferred extending agents. They may be aromatic, aliphatic and cycloaliphatic.

Suitable aromatic polyamines are 4,4'-methylene-bis-(2-chloraniline), 3,3'-dichlorobenzidine, 4,4'-diaminodiphenylsulfone, 4,4'-methylene dianiline. Suitable aliphatic polyamines include ethylene diamine, diethylene triamine, hexamethylene diamine.

Suitable alicyclic and cycloaliphatic polyamines include 1,4-cyclohexane-bis(methylamine), m-xylylene diamine, p-menthane diamine, isophorone diamine.

It is preferred that the polyamines be diluted in ketone solvents with methyl ethyl ketone being the preferred solvent. The ketone and curative solvent mix should be allowed to age at least 30 minutes before addition to the black loaded prepolymer. The solution of polyamine in ketone solvent may be prepared from 10 to 40 percent solids.

The mix of carbon black prepolymer in solvent, and polyamine in solvent, is then used for spreading, spraying, or dipping. The bioelectric polyurethane is then obtained by evaporation of the solvent and final curing at room or elevated temperatures.

Type II. High molecular weight soluble polyurethanes

This type of polyurethane is essentially linear and cannot be heavily cross-linked in order to allow solution in solvents such as tetrahydrofuran, N,N-dimethylformamide and dimethylsulfoxide. Polyester urethanes which are useful include those described in U.S. Pat. 2,871,218. Polyether urethanes are described in U.S. Pat. 2,899,411.

The polyester urethanes of this class are prepared by reacting one mole of essentially linear hydroxyl terminated polyester of a saturated, aliphatic glycol having from 4 to 10 carbon atoms and having hydroxyl groups on its terminal carbon atoms and a carboxylic acid with 1.1 to 3.1 moles of a diphenyl diisocyanate having an isocyanate group on each phenyl nucleus in the presence of 0.1 to 2.1 moles of a saturated, aliphatic free glycol containing from 4 to 10 carbon atoms and having hydroxyl terminal groups, the molar amount of said polyester and said free glycol combined being essentially equivalent to the molar amount of said diphenyl diisocyanate whereby there are essentially no unreacted isocyanate or hydroxyl groups in the reaction product.

The polyurethanes of this type are dissolved in solvents such as tetrahydrofuran, N,N-dimethylformamide and dimethyl sulfoxide, the conductive carbon black is added and then dispersed by rolling with balls or metal rods. A high speed stirrer with good shearing action may also be employed.

The black dispersion of the high molecular weight polyurethane may then be used for brushing, dipping, or spraying. Evaporation of the solvent leaves the bioelectric polyurethane.

Type III. Low molecular weight polyurethanes

Millable gum rubbers of low molecular weight may be prepared as in U.S. Pat. 2,777,831. Polyesters are extended with diisocyanates to give elastomers which can be handled on a mill. Carbon black may be added and dispersed as necessary. Other compounding agents as necessary may also be added. The resulting mix is then extruded or shaped by heating and curing to prepare the artificial internal organs. The material may be dissolved in appropriate solvents. To the black dispersion prepared this way, or by taking the gum rubber, dissolving it in solvent and then adding the conductive carbon black and dispersing it according to methods previously described, is added a polyisocyanate curing agent. The polyisocyanates that may be used include polymethylene polyphenyl isocyanate, triphenylmethane triisocyanate and a reaction product of 3 moles of tolylene diisocyanate and 1 mole of trimethylol propane.

The black dispersion may be used to prepare artificial internal organs. On evaporation of the solvent there is obtained the bioelectric polyurethane.

EXAMPLE I

A conductive bioelectric polyurethane was prepared in the following manner.

Prepolymer preparation

A prepolymer was prepared by degassing under vacuum 100 parts 80 ethylene 20 propylene adipate (reactive Number 60, Mol. Wt. 1870) at 90–100° C. and then adding 28.3 parts molten 4,4'-dicyclohexylmethane diisocyanate with good stirring. The reaction mixture was stirred at atmospheric pressure and at temperatures of 90–120° C. for 50 minutes. The pressure was gradually reduced to 10–20 mm. for degassing over a period of 30 minutes. The prepolymer showed an isocyanate content of 3.5 percent (%NCO).

Prepolymer dilution

The prepolymer was diluted as follows:

| | Parts |
|---|---|
| Prepolymer | 100 |
| Methyl ethyl ketone | 50 |
| Toluene | 50 |
| Total | 200 |

To 100 parts diluted prepolymer was added 10 parts Shawinigan acetylene black. Steel rods 3 inches x ½ inch diam.—three in number, were added to the mix in a can. The contents were placed on rollers for 16 hours to produce the dispersion of conductive black in the diluted prepolymer.

Curative preparation

A curative solution for extending the prepolymer was prepared from

| | Parts |
|---|---|
| 1,4 - cyclohexanebis(methylamine) | 100 |
| Methyl ethyl ketone | 400 |
| Total | 500 |

The curative solution was allowed to age at least one hour before use.

A mandrel for forming arterial grafts was constructed in the following manner. Silicone rubber tubing or natural rubber tubing was fitted over a metal or glass mandrel of desired diameter to allow a precise fit and easy removal. The end of the mandrel was sealed by dipping in natural rubber latex and allowing the latex to air-dry for 15 minutes. Immediately before dipping, the dispersion of carbon black in diluted prepolymer was placed on the rollers for ten minutes. To 110 parts of the diluted black prepolymer was added 110 parts methyl ethyl ketone and 16.5 parts curative solution. After thorough stirring, the mix was poured into a 6 inch x ½ inch diam. test tube. The mandrel was dipped to a depth of five inches with slow continuous rotational movement and then removed slowly while continuing to slowly rotate the mandrel. The mandrel was slowly rotated between dips for ½–3 minutes to allow for some solvent evaporation. The process was repeated until a 10–20 mil thickness coating was obtained. After removal from the last dip the mandrel was rotated until the surface was tack free. The graft over the mandrel was allowed to air cure at room temperature for 12–24 hours prior to oven curing for 1–1½ hours at 110–120° C. After cooling to room temperature the glass or metal mandrel was removed. The polyurethane was separated from the silicone rubber or natural rubber tubing. After the inner tubing was removed the bioelectric polyurethane grafts were cut to the desired lengths for insertion into the carotid artery or the aorta.

EXAMPLE II

The static potentials of several substances commonly used for vascular prostheses were compared with those of polyurethane alone and with varying amounts of carbon black prepared as in Example I. Measurements were made in a normal (physiological) saline solution with respect to a platinum electrode using a Keithley electrometer 200B with an input resistance of $10^{14}$ ohms. The results are given in Table 1.

TABLE 1

| | Mv. negative |
|---|---|
| Latex | 50–100 |
| Vinyl | 100 |
| Polyurethane | 100 |
| Polyurethane+5% carbon black | 100–150 |
| Polyurethane+10% carbon black | 200–300 |
| Polyurethane+15% carbon black | 100–150 |
| Polyurethane+20% carbon black | 100–150 |

The polyurethane with 10 percent carbon black had a resistance of $2 \times 10^5$ to $2 \times 10^6$ ohms per square.

It is obvious from the above results that the polyurethane with 10 percent carbon black had a surprisingly greater static potential than the other items tested, the other materials all showing similar potentials significantly below the 10 percent carbon black material referred to herein as "bioelectric polyurethane." Both the lower concentrations of carbon black and the higher concentrations of carbon black in the polyurethane resulted in a considerably lower negative static potential than the bioelectric polyurethane. Further studies have shown that the dispersion of 10 parts of carbon black in other commonly used materials do not give a significant negative potential.

While we do not limit ourselves to any particular theory of the efficacy of this invention, the critical factor appears to be the precise dispersion of the negatively charged particles in the new polyurethane matrix, i.e., the distance between carbon particles is such that they are able to hold a negative charge. These islands of negativity serve to attract positive ions from the blood stream and allow an exchange of ions with the blood in such a manner that there is a resultant negative charge next to the blood. This, in effect, means that there is an electric double layer of ions created at the blood graft interface similar to that found in the normal blood vessel.

Past experience has demonstrated the efficacy of using the dog's carotid artery for testing arterial substitutes. Occlusions occur early—hours—as compared to late clotting in the thoracic or abdominal aorta—20 to 30 days. We have used a microsurgical technique in over 200 grafting procedures.[4] The surgery has been done by one operator and has therefore been well standardized. The patency in the carotid artery is followed by the insertion of an electromagnetic flow-probe distal to the grafting site. By the use of chronic flow-probes the entire flow pattern can be determined. We have found that the small vascular prostheses constructed of all types of synthetics has clotted in less than 3 hours after insertion.

EXAMPLE III

In this example a similar grafting technique to that described immediately above was used. The bioelectric polyurethane was constructed into short 3.0 mm. I.D. tubes measuring 2.5 to 3.0 cm. in length. Direct suturing with 7-0 silk was accomplished with the aid of an operating microscope. The material was found to be easy to suture without evidence of tearing at the needle puncture sights. Minimal leaking of the graft occurred at the suture lines upon release of the occluding clamps. All specimens were followed to the point of complete occlusion or until there was marked diminution of blood flow. The results are shown in Table 2.

TABLE 2

| Material | Grafts | Patency greater than 24 hours | Patency greater than 72 hours |
|---|---|---|---|
| Polyurethane | 14 | 2 | 0 |
| Polyurethane plus 5% carbon black | 13 | 4 | 0 |
| Polyurethane plus 10% carbon black | 15 | 15 | 15 |

[4] Amer. J. Surgery, 110 (1965), p. 1006.

The marked success of the "bioelectric polyurethane" group is most evident. Not only did this group have all grafts open for more than 24 hours, but it also had a decisively longer interval of patency. The longest patency was 12 days with 3 of the 15 grafts remaining open for ten days or longer. A sample of a graft removed at 3 days of patency showed a thin, well-developed pseudoendothelial lining, which did not progress to complete occlusion. Occlusion in most of the grafts was thought to occur when this layer became detached and was shed off into the blood stream.

Flow in the dog's carotid artery was measured at 8 ml./Kg./min. In the grafts surviving beyond the first 24 hours there was a rather abrupt drop in flow rate indicating a sudden phenomenon resulting in complete occlusion. In those grafts with less than 24 hours patency there was a gradual decrease in flow rate, more indicative of a gradual building up of the neointima. On the other hand sudden occlusion was thought to be indicative of a disruption of the neointimal layer causing a complete filling of the lumen.

From the foregoing the advantages of the bioelectric polyurethane of this invention are apparent. Not only does it have a unique anticlotting quality but it is also easy to suture and can exist in both an elastic and a rigid state. The ease of production of the bioelectric polyurethane should also be stressed. It is foreseeable that this material could readily be adaptable to pumping chambers, valves, and other parts of the artificial internal organ field. This material possesses the same tensile strength as latex, is more resistant to degradation from heat and light, can be autoclaved without changing its properties, and has an excellent tear strength. Further, it absorbs water to a greater degree than latex, but proves to be more impervious to ion exchange. Short term tissue tolerance in the rat has demonstrated no significant toxicity up to four months in situ.

The terms "internal prostheses" and "prostheses for internal use" have been used interchangeably herein to denote artificial blood vessels, and other artificial internal organs and parts thereof and are not to be considered restrictive.

It is believed that the smooth surface of the graft should be altered to allow for proper adhesion of the neointima. One method, not to be considered limiting, is by flocking the inner surface.[5]

The term "static potential" as used herein and in the appended claims will be understood to refer to the interface potenital of the particular composition with reference to a platinum electrode as tested in the manner of Example II.

What is claimed is:

1. In an artificial blood vessel of a size and shape to be implanted in the body, the improvement which comprises said blood vessel being formed of a bioelectric polyurethane having about 10 parts by weight of a conductive carbon black uniformly distributed therein and having a negative static potential of from about 200 to about 300 millivolts.

2. The improvement of claim 1 wherein said blood vessel has an internal diameter of less than about 4.0 mm.

3. In a process of implanting an internal prosthesis, the improvement which comprises implanting a prosthesis formed of a bioelectric polyurethane containing about 10 percent by weight of a conductive carbon black uniformely dispersed therein and having a negative static potential of from about 200 to about 300 millivolts.

4. The improvement of claim 3 wherein said prosthesis is an artificial blood vessel.

5. The improvement of claim 4 wherein said blood vessel has an internal diameter of less than about 4.0 mm.

References Cited

UNITED STATES PATENTS 3,062,772 11/1962 Keplinger et al.
3,219,633 11/1965 Boussu et al.
3,401,141 9/1968 Toth _____ 252—511 XR

OTHER REFERENCES

"Cast Polyurethane Rubber Heart Valves," Rubber and Plastic Age, July 1961, pp. 892–894.

"Latex Vascular Prostheses," by A. F. Finelli et al. Supplement to Circulation, Vol. XXIX, April 1964, pp. 165–170.

"Electrochemical Precipitation of Blood Cells on Metal Electrodes: An Aid in the Selection of Vascular Prostheses" by P. N. Sawyer et al. Proc. N.A.S., vol. 53, 1965, pp. 294–300.

"A Bioelectric Polyurethane Elastomer For Intravascular Replacement" by W. V. Sharp et al., Transactions ASAIO, vol. XII, April 1966, pp. 179–182.

RICHARD A. GAUDET, Primary Examiner

R. L. FRINKS, Assistant Examiner

U.S. Cl. X.R.

128—334; 252—511; 260—37

---

[5] Sharp et al., Circulation, 29 (1964), p. 165.